(No Model.)  2 Sheets—Sheet 1.

A. D. FERGUSON & R. W. WHITNEY.
REVERSING VALVE FOR ENGINES.

No. 554,667.  Patented Feb. 18, 1896.

Witnesses:

Inventors:
A. D. Ferguson and
R. W. Whitney.
By Higdon & Higdon
Attys.

(No Model.) 2 Sheets—Sheet 2.
A. D. FERGUSON & R. W. WHITNEY.
REVERSING VALVE FOR ENGINES.
No. 554,667. Patented Feb. 18, 1896.
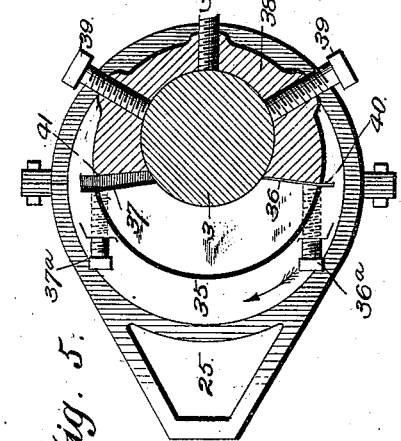
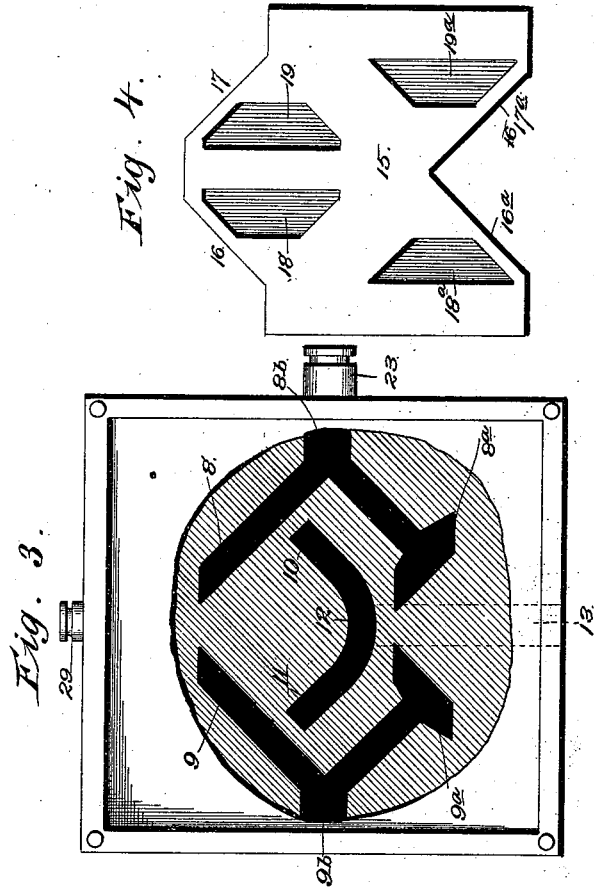
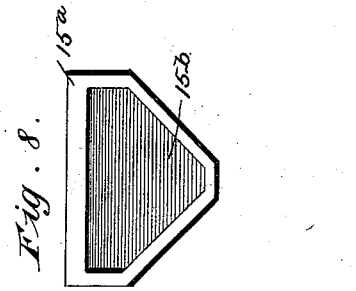
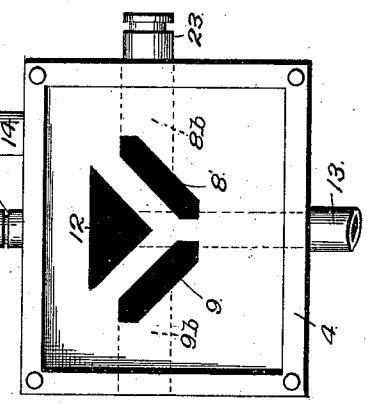
Witnesses:
F. G. Fischer
C. W. Thorpe
Inventors:
A. D. Ferguson and
R. W. Whitney.
By Higdon & Higdon
Attys.

UNITED STATES PATENT OFFICE.

ALFRED D. FERGUSON AND ROBERT W. WHITNEY, OF ODESSA, MISSOURI.

REVERSING-VALVE FOR ENGINES.

SPECIFICATION forming part of Letters Patent No. 554,667, dated February 18, 1896.

Application filed May 8, 1895. Renewed December 13, 1895. Serial No. 572,047. (No model.)

*To all whom it may concern:*

Be it known that we, ALFRED D. FERGUSON and ROBERT W. WHITNEY, of Odessa, Lafayette county, Missouri, have invented certain new and useful Improvements in Reversing-Valves for Stationary and Portable Steam-Engines, of which the following is a full, clear, and exact description, reference being had to the accompanying drawings, forming a part thereof.

Our invention relates to improvements in steam-engines, and our object is to provide steam-engines which are positive and reliable in operation and simple, strong, durable, and inexpensive of construction.

With this object in view the invention consists in certain novel and peculiar features of construction and combinations of parts, as hereinafter described and pointed out in the appended claims.

Figure 1:
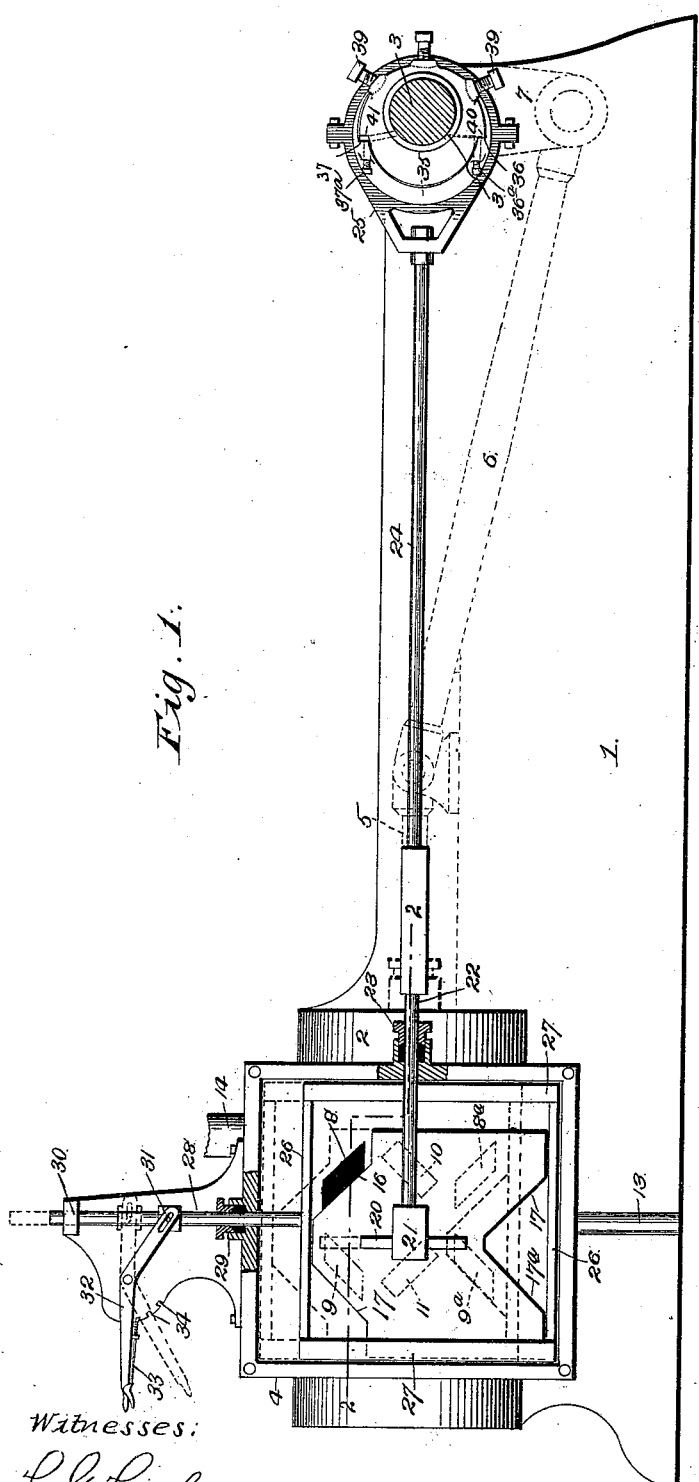
Figure 2:
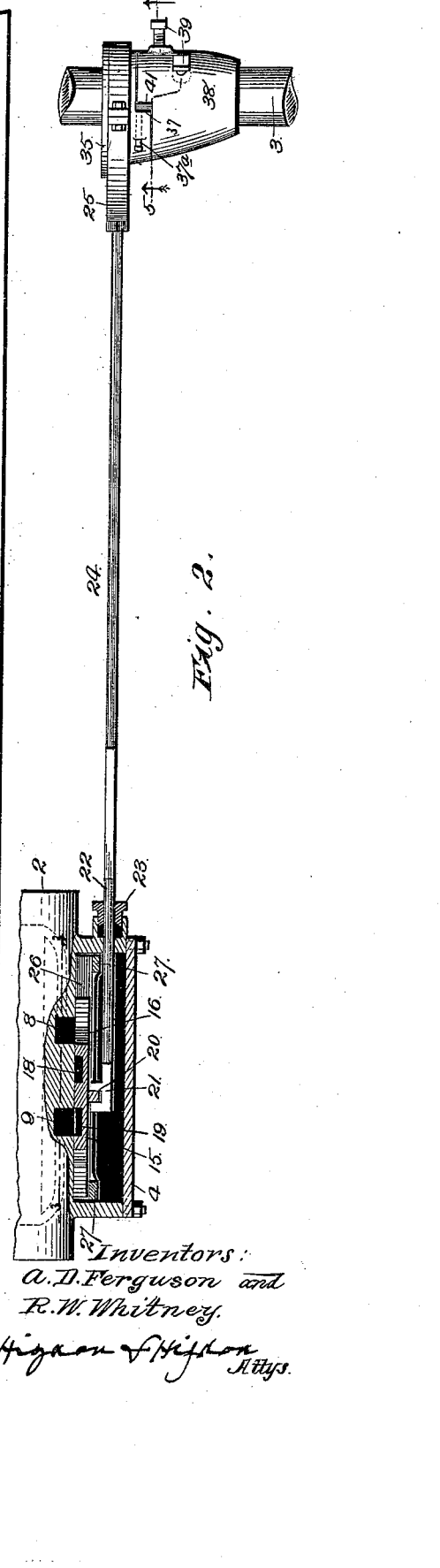

Referring now to the drawings, which accompany and illustrate this application, Figure 1 represents an engine provided with reversing mechanism constructed in accordance with our invention. Fig. 2 is a view, partly in top plan and partly in section taken on the line 2 2, of the same. Fig. 3 is a view, on an enlarged scale, to show the arrangement of the supply and exhaust ports. Fig. 4 is an inverted plan view of our improved valve. Fig. 5 is a sectional view, on an enlarged scale, taken on the line 5 5 of Fig. 2. Fig. 6 is a view in elevation of a portion of a steam-engine with the cap or face-plate of the steam-chest removed to illustrate more clearly a modified construction of valve. Fig. 7 is a view which shows the arrangement of the supply and exhaust ports of the valve shown at Fig. 6, and Fig. 8 is an inverted plan view of said valve.

Like numerals designate corresponding parts throughout the several views, in which—

1 designates the base of an engine; 2, the cylinder; 3, the crank-shaft, and 4 the steam-chest.

5 designates the stem of the piston, (not shown,) and the said stem is pivotally connected by the link 6 with the crank 7 of the shaft in the usual manner.

The steam-chest is connected with the cylinder by duplicate sets of supply-ports. The mouths of the supply-ports for one end of the cylinder are parallel, as shown at 8 and $8^a$, and below the plane of the base of the steam-chest said ports converge outwardly and merge together into the passage $8^b$, leading directly to the adjacent end of the cylinder. The mouths of the supply-ports for the opposite end of the cylinder extend parallel with each other, as shown at 9 and $9^a$, and at right angles to the ports 8 and $8^a$, and below the plane of the base of the steam-chest said ports converge outwardly and merge into a single passage $9^b$, which communicates with the adjacent end of the cylinder. Extending at right angles to and between the mouths of the supply-ports 8 and $8^a$ is the mouth 10, and extending at right angles to and between the mouths of the ports 9 and $9^a$ is a similar mouth 11. Said mouths 10 and 11 communicate below the plane of the base of the steam-chest with the single passage 12, which communicates in turn with the exhaust-pipe 13. Steam is supplied to the chest by the pipe 14 in the usual or any preferred manner. To operate in connection with the said steam-ports we provide a valve 15, constructed as follows: In outline it approximates a barbed arrow-head, having the converging front margins 16 and 17 parallel with the mouths 8 and 9 of the steam-supply port, and having the converging rear margins $16^a$ and $17^a$ extending parallel with the mouths $9^a$ and $8^a$, respectively, of the steam-ports. In the under side of said valve contiguous to the margin 16 is a cavity or passage 18, and opposite to said passage or cavity contiguous to the margin 17 is a similar passage or cavity 19. Extending parallel also and at a distance apart exceeding that between the passages or cavities 18 and 19 are the passages or cavities $18^a$ and $19^a$, also in the under side of the valve contiguous to the margins $16^a$ and $17^a$, respectively.

The passages or cavities 18 and 19 are adapted at times to afford communication between the supply-ports 8 and 10 and 9 and 11, respectively, and the passages or cavities $18^a$ and $19^a$ are adapted to afford communication at times between the supply and discharge ports $8^a$ and 10 and $9^a$ and 11, respectively. Projecting from the outer face of the valve and extending in the operation of its adjustment is a rib 20, and engaging said rib is a fork 21, from which projects at right angles to said rib the valve-stem 22 through the side wall of the steam-chest and the stuffing-box 23 carried thereby, and said stem is connected by the rod 24 with the eccentric 25, mounted upon the crank-shaft in a manner to be hereinafter explained.

Fitting snugly within the steam-chest, so that it may slide at right angles to but have no motion in the direction parallel with the valve-stem, is a rectangular frame, consisting of the parallel ends 26, which fit against the front or rear ends of the valve 15 and the parallel sides 27, which are a distance apart extending the width of the valve and are adapted as the valve is reciprocated by the eccentric to alternately overlap the side margins of the valve (see Figs. 1 and 2) to hold it more securely in position. Projecting upwardly, as shown in the accompanying drawings, from said rectangular frame is a rod 28, which extends through the upper side of the steam-chest and through the stuffing-box 29, carried thereby. The upper end of said rod extends through a guide-sleeve 30, projecting from a casting bolted or otherwise rigidly secured to the steam-chest. A suitable distance from said stuffing-box it is provided with a fixed collar having a pin 31, engaging a slot in the end of the lever 32, fulcrumed upon said casting. Said lever is provided with the usual spring-actuated dog 33, which engages one or the other of the notches 34 of said casting.

From the foregoing it will be apparent that when the lever is in the position shown in full lines the ports 8 and 9 act alternately as the supply-passages, and that when the lever is in the position shown in dotted lines the ports $8^a$ and $9^a$ act alternately as the supply-ports. It will therefore be clearly understood by this arrangement of the supply-ports and by the peculiar construction of the valves that accordingly as the steam is supplied to the cylinder by the ports 8 and 9 or by the ports $8^a$ and $9^a$ the engine is running in one direction or the opposite direction.

We will now proceed to describe the peculiar connection between the crank-shaft and the eccentric, which permits the engine to be easily and quickly started in case it stopped upon "dead-center," or in other words, a connection which permits the valve to be operated sufficiently to obtain a "lead" without affecting the position of the crank-shaft, to permit steam to enter the cylinder and actuate the piston in the usual manner. Referring to this connection in detail, 35 designates a sleeve, which fits rotatably on the shaft and snugly within and forms a part of the eccentric. Said collar is provided at opposite points with shoulders 36 and 37, so as to form practically one section of a clutch, the other section comprising the collar 38, secured rigidly upon the shaft by set-bolts 39. The section 38 is provided with shoulders 40 and 41, opposing the shoulders 36 and 37, respectively. The said shoulders are disposed in such manner that when any two of them are in contact—for instance, the shoulders 36 and 40, as shown—a space is left between the companion pair of shoulders, as also shown in the drawings. To explain clearly the object in thus disposing said shoulders, we will suppose the engine to have stopped on dead-center when running in the direction indicated by the arrow, Fig. 5. To now move the valve slightly to obtain a lead and without operating the crank-shaft, pressure is brought to bear upon the shoulder 36 of the section 35, and said section is rotatably operated until its opposite shoulder, 37, comes in contact with the shoulder 41 of the rigid section 38. This operation obviously causes the valve to move sufficiently to permit steam to enter the inlet supply-ports thus slightly uncovered, when the engine may be started in the customary manner and continue to run in the same direction as before, or the operation may be reversed by properly manipulating the lever 32.

The set-screws $36^a$ and $37^a$ are carried by the collar 35 and form really adjustable portions of said shoulders 36 and 37, respectively, so that the lead may be increased or diminished at will. Supposing, for instance, that the engineer in charge considered the lead of the valve obtained by the movement of the shoulder 37 to the shoulder 41 too great, it would only be necessary for him to advance the set-screws $36^a$ and $37^a$ equal distances beyond their respective shoulders, so that instead of the shoulder 37 the set-screw $37^a$ would come in contact with the shoulder 41, and as the distance between said advanced set-screw and the shoulder 41 would be diminished so correspondingly would the movement of the valve diminish the lead.

It is necessary that both of the set-screws be advanced or withdrawn equal distances, accordingly as the lead is to be diminished or increased; otherwise the lead obtained when the engine was running in one direction would be greater than the lead obtained when the engine was reversed.

We will now refer to the modified form of valve shown in Figs. 6 and 8, and consequently to the ports which are arranged to operate to the best advantage with a valve of this construction. Said valve is approximately triangular in shape, as shown at $15^a$, and is provided in its under side with a cavity $15^b$. This valve is arranged as before within the rectangular sliding frame, formed within the steam-chest, and is adapted alternately to govern either the supply-port 8 and the exhaust-port 12, or the supply-port 9 and the exhaust-port 12, so that when steam is entering the cylinder by way of one of the supply-ports it may escape from the opposite end of the cylinder by way of the other supply-port and the exhaust-port in the usual manner. To automatically proportion the supply of steam admitted to the cylinder according to the load carried by the engine, the stem 28 of the sliding frame in this instance is controlled by the governor 42 of the construction shown or of any other suitable or preferred construction. The governor shown is provided with a gear-pinion 43, which is connected to the crank-shaft of the engine in any suitable or preferred manner, (not shown,) so that as the speed of the governor varies the said frame is operated and causes the valve to expose more or less of the supply-port for the entrance of steam.

It is to be understood that while we have described and illustrated one particular form of valve and arrangement of steam-ports, we do not desire to limit ourselves to this precise construction and arrangement, and that all changes which do not involve a departure from the spirit and scope of the invention will be considered as equivalents of the construction herein described and shown, and also that the modified form of valve and arrangement of ports may be used in connection with the ordinary eccentric, as well as with the one hereinbefore described.

Having thus described our invention, what we claim as new, and desire to secure by Letters Patent, is—

1. A reversing mechanism for steam-engines, comprising a steam-chest provided with two sets of supply-ports and with a pair of exhaust-ports, each of them being adapted to operate in connection with a pair of the supply-ports, a valve within said steam-chest, and provided with a pair of cavities or passages which afford communication alternately between one of the supply-ports and one of the exhaust-ports, and which at the same time leaves exposed the other contiguous supply-port for the entrance of steam, substantially as set forth.

2. A reversing mechanism for steam-engines, comprising a steam-chest having a pair of supply-ports which communicate with one end of the cylinder of an engine, and a second pair of supply-ports which communicate with the opposite end of the cylinder, and with a pair of communicating exhaust-ports, a valve within said steam-chest provided with a pair of cavities or passages adapted to communicate alternately between certain of said supply-ports and between said exhaust-ports, and with a second pair of cavities or passages adapted to communicate alternately between the other pair of supply-ports and said exhaust-ports, substantially as set forth.

3. A reversing mechanism for steam-engines, comprising a steam-chest provided with a pair of supply-ports communicating with each end of the engine-cylinder, and with a pair of exhaust-ports, a valve within said steam-chest provided with a pair of cavities or passages near one end, and with a second pair of cavities or passages near its opposite end, arranged with relation to the various ports substantially as and for the purpose set forth, a sliding frame embracing snugly the front and rear ends of the valve, and means to adjust the same to cause the valve during its reciprocation to keep one set of supply-ports always closed and to alternately open and close the supply-ports of the other set and open communication between the closed port of said last-mentioned set of supply-ports with one of the exhaust-ports, substantially as set forth.

4. In a steam-engine, the combination with the steam-chest having supply-ports communicating with opposite ends of the cylinder and an exhaust-port, of a valve within said steam-chest adapted alternately to open and close said supply-ports and at the same time to open communication between the closed supply-port and the exhaust-port, and an eccentric mounted upon the crank-shaft of the engine, consisting of an outer section, and an inner section, rotatably and eccentrically mounted upon the shaft and loosely within the outer section, and provided with a pair of shoulders, to form practically a clutch-section, a second collar or clutch-section rigidly mounted upon the shaft and provided with shoulders adapted to engage alternately the shoulders of the first-named clutch-section, substantially as set forth.

5. In a steam-engine, the combination with the steam-chest having supply-ports communicating with opposite ends of the cylinder and an exhaust-port, of a valve within said steam-chest adapted to alternately open and close said supply-ports and at the same time to open communication between the closed supply-port and the exhaust-port, and provided with a rib at its outer side, a fork engaging the same, a stem projecting from said fork, an eccentric on the crank-shaft connected to said stem, consisting of an outer section, and an inner section, rotatably and eccentrically mounted upon the shaft and loosely within the outer section, and provided with a pair of shoulders, to form practically a clutch-section, a second collar or clutch-section rigidly mounted upon the shaft and provided with shoulders adapted to engage alternately the shoulders of the first-named clutch-section, substantially as set forth.

6. In a steam-engine, the combination with a steam-chest having supply-ports communicating with opposite ends of the engine-cylinder, and with an exhaust-port, of a valve having a cavity in its under side and of such configuration that it will alternately expose one of said supply-ports for the entrance of steam, and afford communication between the other supply-port and the exhaust-port, a frame within the steam-chest embracing the said valve, a stem projecting through the casing at right angles to the direction of the valve reciprocation, and an expansible and constructable governor mounted upon said stem and adapted to move the same inward or outward and therefore the valve, to proportion the amount of steam admitted to the cylinder to the load carried by the engine, substantially as set forth.

7. In an engine, the combination with a steam-chest having a pair of supply-ports communicating with each end of the cylinder, and a pair of communicating exhaust-ports, and a valve within said steam-chest provided with a pair of cavities or passages adapted to communicate alternately between certain of said supply-ports and between said exhaust-ports, and with a second pair of cavities or passages adapted to communicate alternately between the other pair of supply-ports and said exhaust-ports, and means to adjust said valve transversely of its direction of reciprocation, of an eccentric mounted upon the crank-shaft of the engine and connected with said valve, consisting of an outer section, and an inner section rotatably and eccentrically mounted upon the shaft within the outer section, and provided with a pair of shoulders, and with a pair of set-screws, and a collar or clutch-section rigidly mounted upon the shaft and provided with shoulders adapted to engage alternately the shoulders or the set-screws of said eccentric, substantially as set forth.

In testimony whereof we affix our signatures in presence of two witnesses.

ALFRED D. FERGUSON.
ROBT. W. WHITNEY.

Witnesses:
P. J. HEISLER,
WM. L. SIMPSON.